US012585775B2

(12) United States Patent 
Llamas Virgen et al.

(10) Patent No.: US 12,585,775 B2 
(45) Date of Patent: Mar. 24, 2026

(54) REQUEST MANAGER FOR MANAGING SERVICE REQUESTS IN A TRUST ENVIRONMENT

(71) Applicant: INTERNATIONAL BUSINESS MACHINES CORPORATION, Armonk, NY (US)

(72) Inventors: Paul Llamas Virgen, Guadalajara (MX); Su Liu, Austin, TX (US); Utz Bacher, Dettenhausen (DE); Dario Andres Silva Moran, La Plata (AR)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 18/469,986

(22) Filed: Sep. 19, 2023

(65) Prior Publication Data

US 2025/0094592 A1 Mar. 20, 2025

(51) Int. Cl.
G06F 21/57 (2013.01)

(52) U.S. Cl.
CPC ........ G06F 21/57 (2013.01); G06F 2221/034 (2013.01)

(58) Field of Classification Search
CPC .......................... G06F 21/57; G06F 2221/034
See application file for complete search history.

(56) References Cited

U.S. PATENT DOCUMENTS

| | | | |
|---|---|---|---|
| 9,385,977 B2 | 7/2016 | Logan | |
| 10,320,735 B2 | 6/2019 | Shah | |
| 11,316,693 B2 * | 4/2022 | Telfer | H04L 67/025 |
| 2013/0254315 A1 | 9/2013 | Solyanik | |
| 2015/0066817 A1 | 3/2015 | Slayton | |
| 2019/0208024 A1 | 7/2019 | Jablonski | |
| 2022/0303282 A1 * | 9/2022 | Barriga | H04L 63/0281 |
| 2022/0376980 A1 | 11/2022 | Bhat | |
| 2023/0188504 A1 * | 6/2023 | Provine | H04L 63/1416 |
| | | | 726/26 |

FOREIGN PATENT DOCUMENTS

| | | |
|---|---|---|
| RU | 2653250 | 5/2018 |

OTHER PUBLICATIONS

Agnostic Edge Ecosystem for Sharing Device Capabilities. 
Context Aware Workflow Automation in Any Multi-IoT Device Ecosystem. 
Situation-Aware Dynamic Service Coordination in an IoT Environment.

* cited by examiner

*Primary Examiner* — Beemnet W Dada 
(74) *Attorney, Agent, or Firm* — Teddi E. Maranzano

(57) ABSTRACT

A request manager for managing service requests in a trust environment, where the trust environment includes a number of devices configured to communicate within the environment including Internet of Things (IoT) devices. The request manager includes: a processor; a memory storing programing for the processor to manage service requests; and a network connection for the processor to communicate with a client device to receive a service request and with devices in the trust environment providing services to complete the service request. The programming causes the request manager to receive a service request from a client device and determine how to complete the service request with the services available within the trust environment.

11 Claims, 8 Drawing Sheets

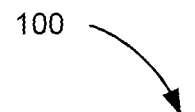

100

COMPUTER 101

PROCESSOR SET 110

PROCESSING CIRCUITRY 120        CACHE 121

COMMUNICATION FABRIC 111

VOLATILE MEMORY 112

PERSISTENT STORAGE 113

OPERATING SYSTEM 122

APPLICATION CODE 150

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

*Fig. 1*

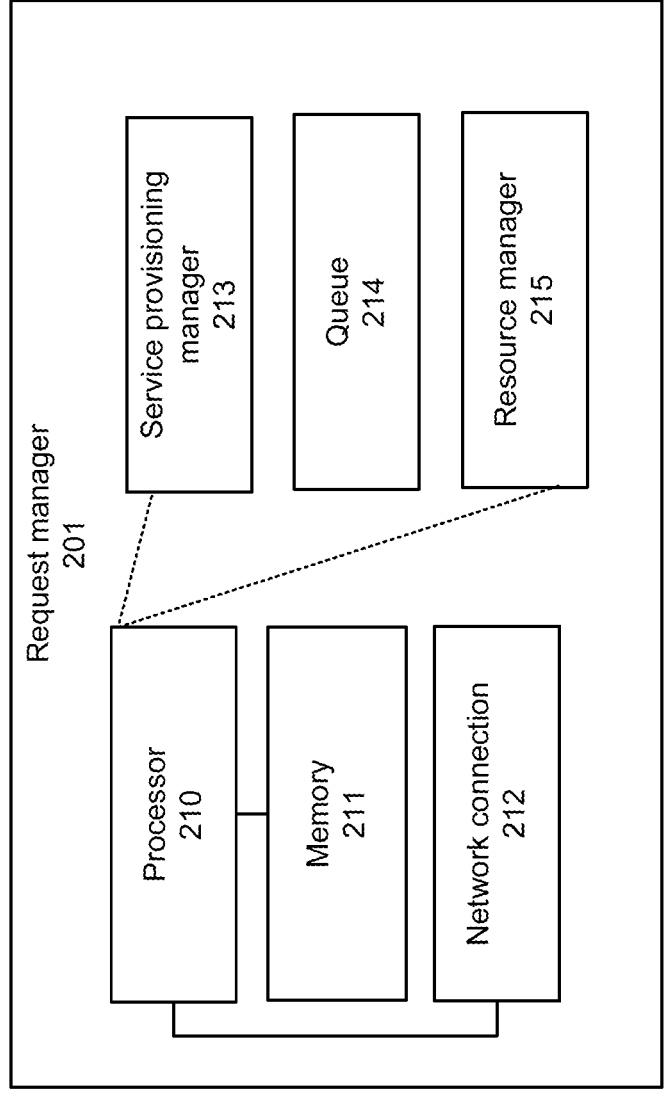
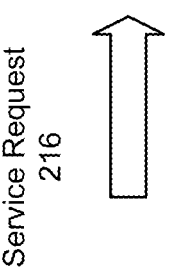
*Fig. 2*

With a request manager, receive a service
request from a client
250

Determine how to complete the service
request with one or more services available
within a trust environment
251

Deliver the service request to the identified
service or services for completion
252

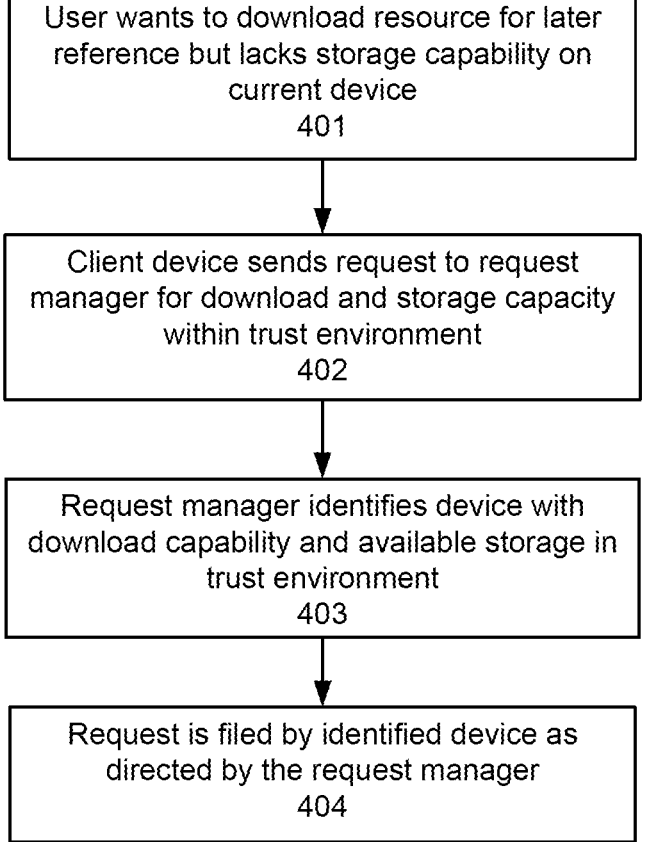

User wants to download resource for later reference but lacks storage capability on current device
401

Client device sends request to request manager for download and storage capacity within trust environment
402

Request manager identifies device with download capability and available storage in trust environment
403

Request is filed by identified device as directed by the request manager
404

*Fig. 6*

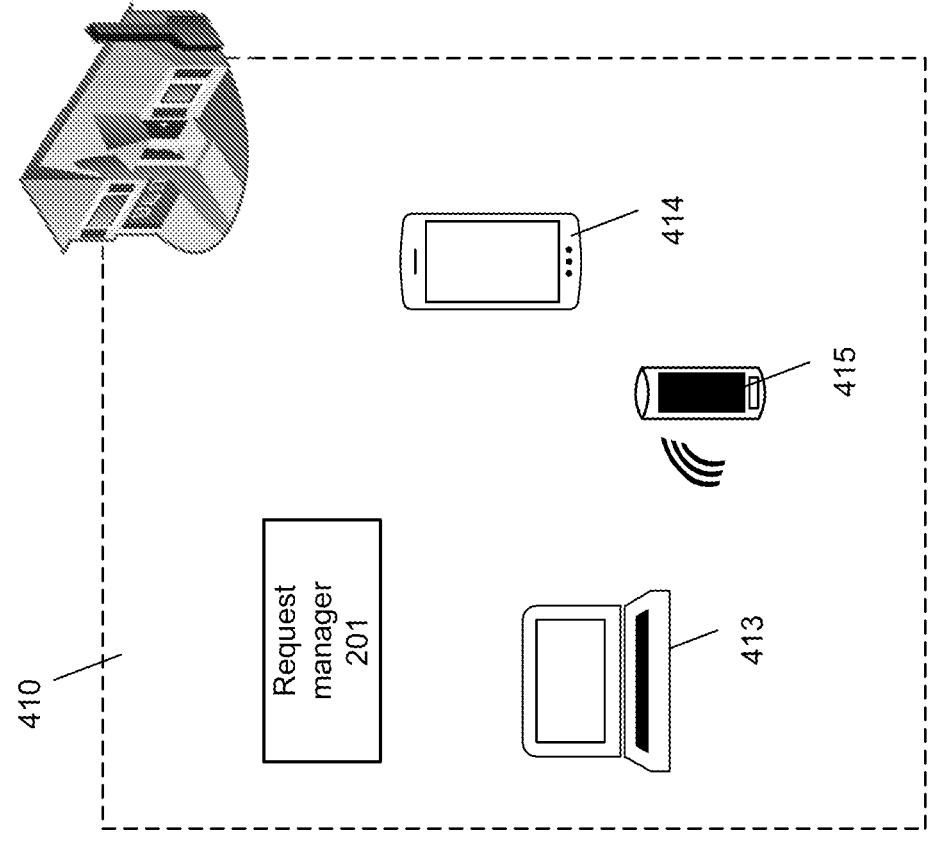
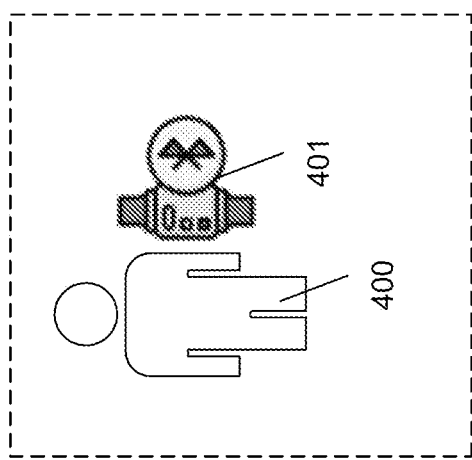
*Fig. 7*

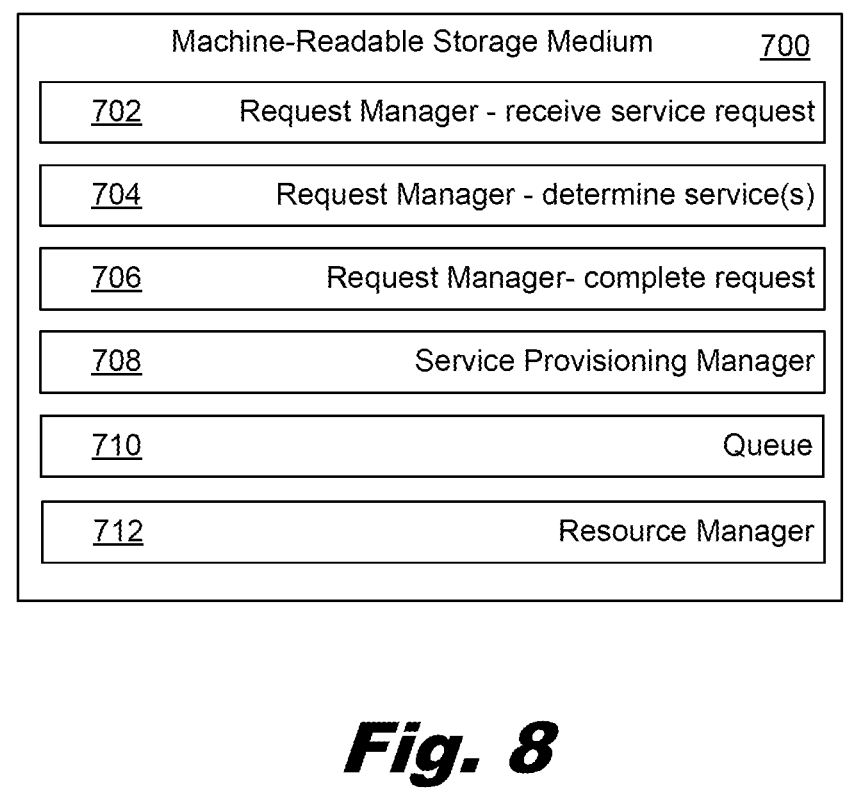

| | |
|---|---|
| Machine-Readable Storage Medium | 700 |
| 702 | Request Manager - receive service request |
| 704 | Request Manager - determine service(s) |
| 706 | Request Manager- complete request |
| 708 | Service Provisioning Manager |
| 710 | Queue |
| 712 | Resource Manager |

*Fig. 8*

REQUEST MANAGER FOR MANAGING SERVICE REQUESTS IN A TRUST ENVIRONMENT

BACKGROUND

The term "Internet of Things" (IoT) refers to a network of physical devices that are equipped with, for example, sensors, software, and other technologies for the purpose of connecting and exchanging data with other devices and systems over the internet. These devices range from ordinary household objects to sophisticated industrial tools.

Frequently, an IoT device is configured for a single purpose or task and has capabilities that are isolated from any other use. As a result, only at certain times is the capability of a particular IoT device fully utilized, if ever. The following description recognizes and addresses the technical problem that exists in the underutilization of IoT devices that may have cumulative capabilities that are substantial, but not ever fully utilized.

SUMMARY

According to an example of the present subject matter, a request manager for managing service requests in a trust environment comprising a number of devices configured to communicate within the environment including Internet of Things (IoT) devices. The request manager includes: a processor; a memory storing programing for the processor to manage service requests; and a network connection for the processor to communicate with a client device to receive a service request and devices in the trust environment providing services to complete the service request. The programming causes the request manager to receive a service request from a client device and determine how to complete the service request with the services available within the trust environment.

According to another example of the present subject matter, a computer implemented method for managing service requests in a trust environment is described, where the trust environment includes a number of registered devices that are configured to communicate within the environment including Internet of Things (IoT) devices. The example method includes: with a request manager, receiving a service request from a client device; with the request manager, determining how to complete the service request with one or more services available within the trust environment so as to increase overall utilization of the devices registered in the trust environment; and with the request manager, delivering the service request to the identified service or services for completion.

According to still another example of the present subject matter, a computer program product is described that includes a non-transitory computer-readable medium comprising programming for a processor, alone or in combination with other processors, to, when executed, cause the processor to manage service requests in a trust environment, the trust environment comprising a number of registered devices that are configured to communicate within the environment including Internet of Things (IoT) devices. The programming, when executed, causes the processor to: implement a request manager for receiving a service request from a client device; with the request manager, determine how to complete the service request with one or more services available within the trust environment so as to increase overall utilization of the devices registered in the trust environment; and with the request manager, deliver the service request to the identified service or services for completion. When the request manager is unable to identify an executing service within the trust environment to complete the service request, the request manager passes the service request to a service provisioning manager.

BRIEF DESCRIPTION OF THE DRAWINGS

FIG. 1 depicts a computing environment for the execution of a computer-implemented method or application according to an example of the principles described herein.

FIG. 2 depicts an example request manager for managing service requests in a trust environment that includes a number of devices configured to communicate within the environment including Internet of Things (IoT) devices according to an example of the principles described herein.

FIG. 6 depicts an example of a specific use case for managing service requests in the trust environment according to an example of the principles described herein.

FIG. 7 depicts another example of a specific use case for managing service requests in the trust environment according to an example of the principles described herein.

FIG. 8 depicts a computer-readable medium with programming for managing service requests in the trust environment according to an example of the principles described herein.

DETAILED DESCRIPTION

Figure 3:
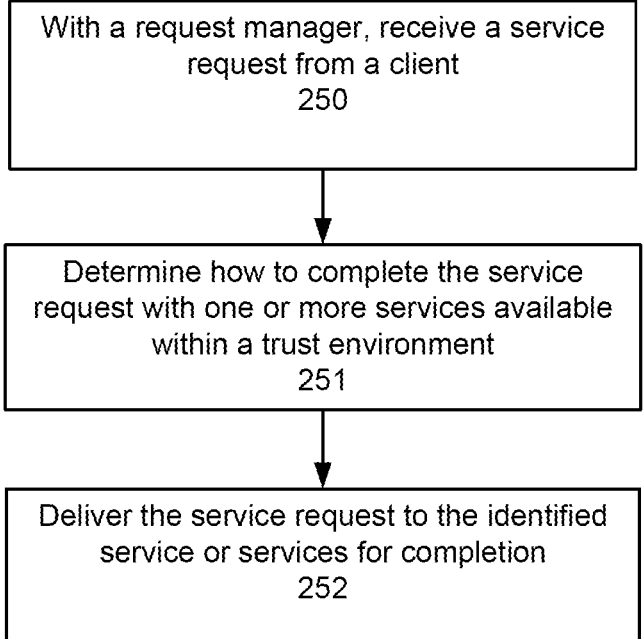
FIG. 3 depicts an example of a computer-implemented method for managing service requests in the trust environment according to an example of the principles described herein.

As noted above, IoT devices are typically configured for a single purpose with isolated capabilities. Thus, only at certain times, if ever, are all existing resources utilized. Rather, most of the time, IoT device resources may remain idle and unutilized. Frequently, the cumulative capabilities of all the IoT devices in a given location are substantial but cannot be leveraged because the devices are not integrated into a common ecosystem or orchestrated as a unified entity with diverse capabilities.

Consequently, a technical problem arises from the lack of coordination and integration among IoT devices, preventing them from operating together as a cohesive system. Each device functions independently and is limited to its specific capability. This results in underutilization of resources and missed opportunities for leveraging the collective potential of the IoT ecosystem.

By transforming the fragmented landscape of isolated IoT devices into a unified ecosystem, the potential benefits are significant. Such an approach would enable optimized resource utilization, reduced costs, improved energy efficiency, and the ability to deliver more sophisticated and integrated IoT solutions. Currently, IoT devices do not support task dispatching to distribute a workload to other devices including properly taking into account capabilities factors.

Consequently, there is a need to establish a unified ecosystem or orchestration framework that can seamlessly integrate and coordinate the diverse capabilities of IoT devices. By doing so, the combined capabilities of all devices can be harnessed, unlocking their full potential. This orchestration framework would enable IoT devices to collaborate and share resources efficiently, maximizing their utilization and enhancing overall system performance.

The envisioned ecosystem provides a platform where IoT devices from different manufacturers, with varying capabilities, can seamlessly communicate, interact, and work together. It also enables the creation of innovative applications and services that leverage the collective capabilities of multiple devices, offering enhanced functionality, scalability, and efficiency.

The following description proposes a method to generate an environment-agnostic IoT personal device to share specific capabilities that many of the devices will be able to do. The idea is to extend the capabilities of those devices that are not able to execute specific tasks taking advantage of the others that are creating an agnostic edge ecosystem for the user to enable different capabilities in the ecosystem itself. The following will describe a technical solution to this technical data management problem.

As used herein and in the appended claims, the term Internet of Things (IoT) device refers to a device that is equipped with, for example, sensors, firmware/software, and other technologies for the purpose of connecting and exchanging data with other devices and systems over the internet. Examples include smartwatches, smart cameras, smart phones, smart appliances and others.

As used herein and in the appended claims, the term "request manager" refers, in some instances, to an application with the functionality for managing service requests in a trust environment, where the trust environment includes a number of devices configured to communicate within the environment including Internet of Things (IoT) devices. Alternatively, "request manager" can also refer to a hardware or virtual device that is executing such an application to provide the functionality.

As used herein and in the appended claims, the term "trust environment" refers to a network of devices, including IoT devices, that are configured to operate with a request manager and handle service requests under the direction of the request manager.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse or any given order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As used in the present specification and in the appended claims, the term "a number of" or similar language is meant to be understood broadly as any positive number including 1 to infinity.

Turning now to the figures, FIG. 1 depicts a computing environment 100 for the execution of unknown object sub-class identification according to an example of the principles described herein.

Computing environment 100 contains an example of an environment for the execution of at least some of the computer code involved in performing the inventive methods, an application to provide context specific recommendations to producers regarding the satisfaction of their users. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

The EUD 103 may be a client device operated by a producer of services or products that wants an analysis of available user data to ascertain user satisfaction. Operation of the EUD 103 for this objective will be described in further detail below.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

As described further below, the EUD 103 may use the network 102 to access an application on remote server 104. The application will access, again using the network 102, available user data. The application will then analyze the user data, with context specific analysis, to ascertain user satisfaction and generate recommendations for the producer based on the analysis.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The following description provides for seamless integration and coordination of IoT devices as an extended multi-purpose ecosystem, i.e., a trust environment. The request manager that will be described in greater detail serves as a central orchestrator providing a coordinator service with capabilities for resource management and tasks allocation in the trust environment, including the population of IoT devices. The request manager also provides a central service for handling situations where services are temporarily offline. In such cases, services are either created/instantiated on demand or a service request is held back until resources/capabilities become available again. Specifically, the request manager, along with its service provisioning manager provide for an offline task dispatcher and scheduler with queuing schemas as a complementary capability of the central orchestrator based on required resources for tasks and resource allocation.

This approach also provides insights for purchasing purposes to add needed devices to the trust environment based on service requests that cannot currently be completed. The system being described also defines a central knowledge base for improving resource allocation and tasks distribution as well as learning strategies for future tasks allocation purposes. This includes discovery and capability mapping for knowledge base enrichment for tasks association and smart distribution. The system also provides for the capabilities discovery for new devices being added to ecosystem or trust environment, and, conversely, monitoring of devices and capabilities removed.

FIG. 2 depicts an example request manager for managing service requests in a trust environment that includes a number of devices configured to communicate within the environment including Internet of Things (IoT) devices according to an example of the principles described herein. As shown in FIG. 2, a request manager 201 is provisioned for managing service requests in a trust environment. The trust environment includes a number of devices configured to communicate with each other within the environment including Internet of Things (IoT) devices. In this example, the request manager 201 includes: a processor 210; a memory 211 storing programing for the processor to manage service requests; and a network connection 212 for the processor 201 to communicate with a client device to receive a service request 216 and with devices in the trust environment that are providing services to complete the service request. The programming causes the request manager 210 to receive a service request 216 from a client device and determine how to complete the service request with the services available within the trust environment. As noted above, the term "request manager" can refer to the request manager application stored in the memory 211 or to the hardware shown in FIG. 2 that is executing the application to function as a request manager.

As will be described in detail below, the request manager 201 can also include a service provisioning manager 213, a queue 214 for service requests and a resource manager 215. These components can be incorporated into the request manager 201, as shown in FIG. 2. Alternatively, these components can be instantiated separately or on other devices and in communication with the request manager 201.

FIG. 3 depicts an example of a computer-implemented method for managing service requests in the trust environment according to an example of the principles described herein. This flowchart of FIG. 3 can describe an example of the operation of the resource manager 201 shown in FIG. 2.

As shown in FIG. 3, the workflow begins with a request manager receiving 250 a service request from a client device. The client device may be a device registered within the trust environment or may be a device communicating from outside the trust environment but with authorization to utilize services in the trust environment. The service request may be, for example, to send a message, download a file, provide data storage, report current sensor data or any other service that is available from components or devices of the trust environment.

Next, the workflow includes, with the request manager, determining 251 how to complete the service request with one or more services available within the trust environment so as to increase overall utilization of the devices registered in the trust environment. With a population of IoT and other devices registered in the trust environment, the request manager can contact an available or underutilized device to complete or assist with the service request. In some cases, multiple devices from the trust environment may be, or may need to be, enlisted to complete the service request. Consequently, rather than possibly performing only a single function, IoT devices in the trust network become available, via the request manager, to perform service requests and thus increase the utilization and value of devices in the trust environment.

Once the request manager has determined how to complete the service request with services in the environment, the workflow concludes with the request manager delivering 252 the service request to the identified service or services for completion.

Figure 4:
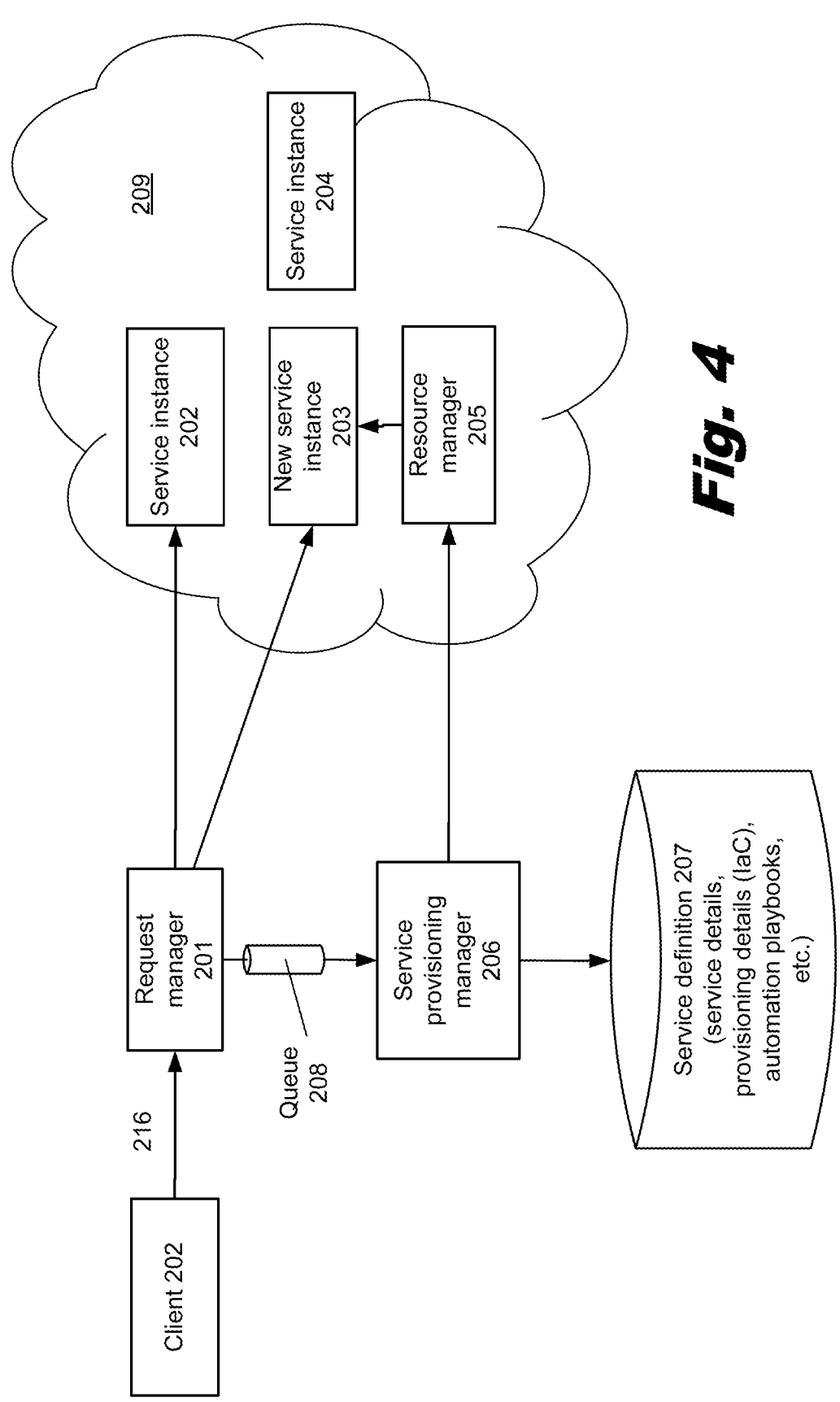
FIG. 4 depicts an example system for managing service requests in the trust environment according to an example of the principles described herein.

FIG. 4 depicts an example system for managing service requests in the trust environment according to an example of the principles described herein. As shown in FIG. 4, the trust environment 209 may have a number of service instances 202 and 204 at any given time. Some service instances, e.g., 204, may be offline at a given moment.

A client 202 submits a service request 216 to the request manager 201. The request manager 201 will determine if there is an instantiated and available service 202 in the trust environment 209 that has the capabilities needed to complete the service request 216. If so, the request manager 201 will submit the request 216 to that service instance 202 for completion. The results of the service request or a report of completion may be returned by the request manager 201 to the client 202.

If, however, the request manager 201 is unable to identify a service instance in the trust environment ready to complete the service request 216, the request 216 is placed in a queue 208. A service provisioning manager 206 is then utilized to assist with completion of the request. As noted above, the service provisioning manager 206 is an application with the functionality described herein that may be on a same or a different device as the request manager. The service provisioning manager 206 functions to identify a service with the capability to perform the service request and have that service instantiated in the trust environment 209, if possible.

If the service provisioning manger 206 is online, the request manager may bypass the queue 208 and send an unfulfilled service request directly to the service provisioning manger 206. However, if the service provisioning manager 206 is overloaded, offline or otherwise unavailable, the service request can be stored in the queue. 208 until the service provisioning manager 206 is available.

When the service provisioning manager 206 takes up a service request, the service provisioning manger 206 uses the information of the service request to match the request with a service that can complete the request. For example, the service request may specify to send a message via a particular communication channel. Consequently, an application for that communication channel will provide the service required by the service request. In another example, the service request may be to download and store files. Consequently, a device in the trust environment with storage capacity and an interface to download the files can provide the service needed for that service request.

When devices or new applications/services are installed in the trust environment, a part of the provisioning is to register with the request manager system. The request manager may also have a function to discover new devices or applications/services installed in the trust environment. This creates a database 207 of service definitions for all the services potentially available in the trust environment. Specifically, the database 207 includes any of: service details, provisioning details (like infrastructure-as-code (IaC)), automation playbooks and other information that defines the services available from the devices and applications in the trust environment. Consequently, when the service provisioning manager 206 receives the service request 216, the service provisioning manager 206 can access the service definition database 207 to determine what service or combination of services in the trust environment can be utilized to complete the service request 216.

Once the service provisioning manager 206 has determined the service needed for the service request, if there is no available instance of that service currently in the trust environment, the service provisioning manager 206 calls a resource manager 205. The resource manager 205 has the function of instantiating a service in the trust environment 209. The resource manager 205 may be a central application or may be a component of several or all of the different devices or applications in the trust environment 209. As requested by the service provisioning manager 206, the resource manager 205 invokes a new service instance 203 that will have the capabilities matching the requirements of the service request 216. The request manager 201 can then submit the service request 216 to the new service instance 203 for completion.

Additionally, if it is ultimately determined by the service provisioning manager 206 that there is no service provider in the trust environment that can complete the service request, the request is also stored in the queue 208. In this way, an owner or administrator of the trust environment can use the unfulfilled service requests in the queue as a guide to what devices and services could be usefully added to the trust environment 209 to expand capabilities.

Figure 5:
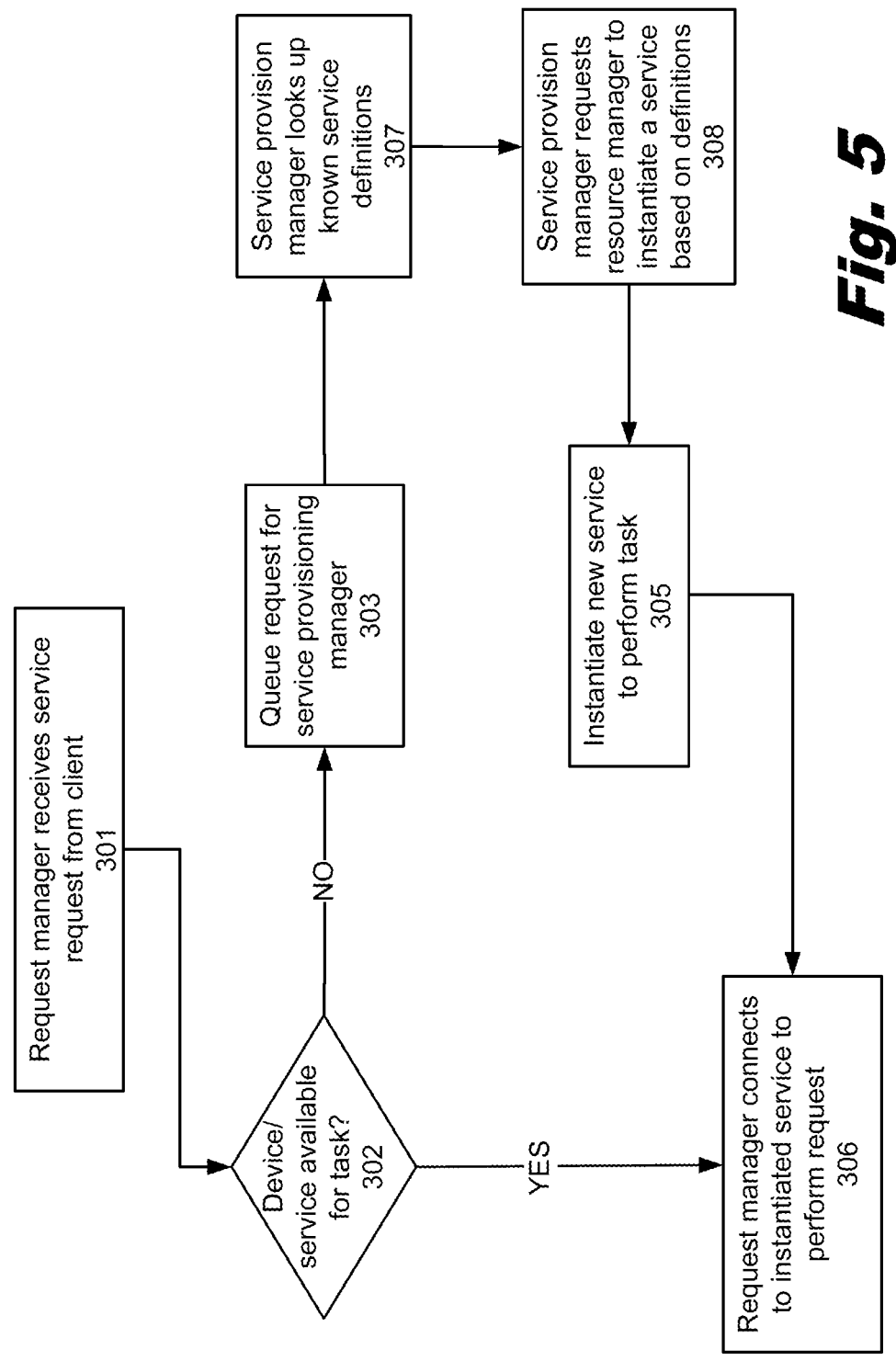
FIG. 5 depicts a flow chart of an approach for managing service requests in the trust environment according to an example of the principles described herein.

FIG. 5 depicts a flow chart of an approach for managing service requests in the trust environment according to an example of the principles described herein. The workflow of FIG. 5 may be implemented by the system of FIG. 4 described above. As shown in FIG. 5, the request manager receives a service or task request from the client 301. The request manager then determines whether a service (and supporting device) are available in the trust environment to complete the request 302. If so, the request manager connects to the identified service to perform the request 306.

When, however, there is not currently an available service to complete the request, the request is added to a queue for the service provisioning manager 303. The service provisioning manager then looks up known service definitions in the service definition database to identify a service or combination of services needed to complete the request 307. The service provisioning manager then requests the resource manager to instantiate a service instance based on the service definition from the database 308. The resource manager instantiates the new service to perform the service request 305. The request manager can then connect to the newly instantiated service to perform the service request 306.

FIG. 6 depicts an example of a specific use case for managing service requests in the trust environment according to an example of the principles described herein. In the example of FIG. 6, a user may be operating a device that is registered to and a part of the trust environment. During this usage, the user identifies a resource 401 that the user wants to download for later reference, for example, a video, large document or executable object. However, the device the user is currently operating has limited data storage capabilities, for example, a smart watch.

Consequently, the client device that the user is operating sends a service request 402 to the request manager of the trust environment. The service request is for another device of the trust environment to download and store the resource identified by the user. The request manager will then identify a device 403, as a service provider in the trust environment, that has the capability to perform this service request. This will require the identified service provider to have the capability to access and download the identified resource, perhaps using a Uniform Resource Locator (URL) specified in the service request and the storage capacity to store the resource until later required by the user.

The request manager then directs the identified service provider to complete the request 404. The identified service provider then accesses, downloads and stores the resource in the trust environment. The user can then retrieve and utilize the resource from within the trust environment as desired.

In a similar example, the client device may be a smart camera. The user may be operating the camera which has filled its internal storage capacity with photographs and videos. Needing more storage capacity, the smart camera, which is part of the trust environment, can send a service request to the request manager for additional data storage capacity. The request manager will then identify unused data storage capacity on a device in the trust environment. Through the request manager, the smart camera can then transfer image/video data to the additional storage capacity identified on the other device in the trust environment. In this example, the smart camera can be located anywhere there is access to the internet that allows the camera to communicate with the request manger over the internet.

FIG. 7 depicts another example of a specific use case for managing service requests in the trust environment according to an example of the principles described herein. In this scenario, the user 400 has left a home environment 410 that constitutes at least a part of the trust environment. For example, the user 400 may have gone out for a run and is carrying only a smart watch 401. The smart watch 401 is registered to the trust environment but has limited communication capabilities, such as Bluetooth or WiFi. Thus, the smart watch 401 can communicate when within the trust environment or on WiFi, but not otherwise.

In this example, while the user is away from any applicable connection to the trust environment for the smart watch 401, the user remembers a need to send a message by a particular communications application to a peer to review a file, for example, a slide deck. Consequently, while having this thought in mind, the user issues a voice command to the smart watch 401 to send a message via the specified communications application to a specific colleague with the content "Please check results in the file we are finalizing." At that time, the smart watch 401 does not have the ability to send messages via the specified communication application and does not have the ability to contact the request manager of the trust environment. Thus, the smart watch 401 will encapsulate the command to be exposed later when contact with the trust environment becomes possible.

When the user returns to the home environment 410, the smart watch 401 regains communication with the request manager 201 and submits the encapsulated command as a service request to the request manager 201. In the illustrated example, the home/trust environment 410 may include a laptop 413, a smart phone 414 and a smart speaker 415, each with different applications and services. Using the techniques and technology described above, the request manager 201 will determine which device and which application or services in the trust environment can be used to complete the service request. For example, the request included a specific communication application to be used to send the requested message. This communications application may be installed on both the laptop 413 and the smart phone 414, but not available via the smart speaker 415. Thus, the request manger 201 can instruct either the laptop 413 or the smart phone 414 to send the stated message using the specified communications application. If either the laptop 413 or the smart phone 414 is offline at the time, the request manager 201 can make use of the other device/service to avoid a delay in completing the service request.

In a different example, the request manager may not be present or online. In such a case, the smart watch 401 may, upon connection to the trust network, send the service request to all the devices of the trust environment. The device or devices with the capacity to complete the service request will then respond to execute the request.

The technological solutions describe above can also be used to simplify some tasks, particularly for those users that are less comfortable operating electronic devices. For example, assume a user wants to transfer an image or photograph from a smartphone to a laptop or other device that stores an image gallery. In such a case, the user may be familiar with sending messages using a messaging or social media application. Consequently, the user sends a message to himself or herself using the message or social media application with which he or she is familiar. The message content may say that the specified picture is to be stored, via the trust environment, to a personal computer or other specified or predetermined image gallery. With the message being self-addressed, it is sent to the request manager. The request manager then executes the message as a service request to store the image as specified. In this way, the user only needs to operate a simple messaging or social media app rather than complete all the steps needed to transfer the image file from the phone to the intended repository.

FIG. 8 depicts a computer-readable medium with programming for managing service requests in the trust environment according to an example of the principles described herein. As shown in FIG. 8, a computer program product is described that includes a non-transitory computer-readable medium 700 containing programming for a processor, alone or in combination with other processors, to, when executed, cause the processor to manage service requests in a trust environment, the trust environment comprising a number of registered devices that are configured to communicate within the environment including Internet of Things (IoT) devices. The programming, when executed, causes the processor to: implement a request manager for receiving a service request from a client device; with the request manager, determine how to complete the service request with one or more services available within the trust environment so as to increase overall utilization of the devices registered in the trust environment; and with the request manager, deliver the service request to the identified service or services for completion. When the request manager is unable to identify an executing service within the trust environment to complete the service request, the request manager passes the service request to a service provisioning manager.

As shown in FIG. 8, the medium 700 stores the instructions or programming described above, specifically, the request manager programming to receive service requests 702, the request manager programming to determine available services 704, the request manager programming to complete a request with an identified service 706, the programming for the service provision manger 708, the programming for the queue 710 and the programming for the resource manger 712, all as described above.

What is claimed is:

1. A request manager for managing service requests in a trust environment, the trust environment comprising a number of devices configured to communicate within the environment including Internet of Things (IoT) devices, the request manager comprising:

a processor;

a memory storing programing for the processor to manage service requests; and a network connection for the processor to communicate with a client device to receive a service request and with devices in the trust environment providing services to complete the service request;

querying by a service provisioning manager a service definition database, based on capabilities needed to complete the service request and signal the resource manager to instantiate the new service based on the query of the service definition database;

based on the service provisioning manager being offline, storing the service request in a queue of the service provisioning manager until the service provisioning manager becomes available;

based on the service provisioning manager being unable to identify a service that could be provisioned within the trust environment to complete the service request, storing the service request in a queue until provisioning of a service capable of completing the service request becomes possible; and the programming causing the request manager to receive a service request from a client device and determine how to complete the service request with the services available within the trust environment.

2. The request manager of claim 1, wherein the request manager is to identify a service within the trust environment capable of completing the service request and to deliver the service request to the identified service for completion.

3. The request manager of claim 1, further comprising a service provisioning manager, wherein, when the request manager is unable to identify an executing service within the trust environment to complete the service request, the service request is passed to the service provisioning manager.

4. The request manager of claim 3, further comprising a resource manager, wherein the service provisioning manager signals the resource manager to instantiate a new service to complete the service request, the request manager to then use the new service to complete the service request.

5. A computer implemented method for managing service requests in a trust environment, the trust environment comprising a number of registered devices that are configured to communicate within the environment including Internet of Things (IoT) devices, the method comprising:

with a request manager, receiving a service request from a client device;

with a service provisioning manager, querying a service definition database based on capabilities needed to complete the service request;

with the service provisioning manager, signaling a resource manager to instantiate a new service based on the query of the service definition database;

based on the service provisioning manager being offline, storing the service request in a queue of the service provisioning manager until the service provisioning manager becomes available; based on the service provisioning manager being unable to identify a service that could be provisioned within the trust environment to complete the service request, storing the service request in a queue until provisioning of a service capable of completing the service request becomes possible;

with the request manager, determining how to complete the service request with one or more services available within the trust environment so as to increase overall utilization of the devices registered in the trust environment; and with the request manager, delivering the service request to the identified service or services for completion.

6. The method of claim 5, wherein the request manager is to identify multiple devices in the trust environment that collectively provide services capable of completing the service request.

7. The method of claim 5, further comprising, when the request manager is unable to identify an executing service within the trust environment to complete the service request, passing the service request to a service provisioning manager.

8. The method of claim 7, further comprising: with the service provisioning manager, signaling a resource manager to instantiate a new service to complete the service request; and with the request manager, using the new service to complete the service request.

9. A computer program product comprising a non-transitory computer-readable medium comprising programming for a processor, alone or in combination with other processors, to, when executed, cause the processor to manage service requests in a trust environment, the trust environment comprising a number of registered devices that are configured to communicate within the environment including Internet of Things (IoT) devices, the programming, when executed, causing the processor to:

implement a request manager for receiving a service request from a client device;

with a service provisioning manager, querying a service definition database based on capabilities needed to complete the service request;

with the service provisioning manager, signaling a resource manager to instantiate a new service based on the query of the service definition database;

based on the service provisioning manager is offline, the programming further causes storing the service request in a queue of the service provisioning manager until the service provisioning manager becomes available;

based on the service provisioning manager is unable to identify a service that could be provisioned within the trust environment to complete the service request, the programming further causes storing the service request in a queue until provisioning of a service capable of completing the service request becomes possible;

with the request manager, determine how to complete the service request with one or more services available within the trust environment so as to increase overall utilization of the devices registered in the trust environment; and with the request manager, deliver the service request to the identified service or services for completion;

wherein, when the request manager is unable to identify an executing service within the trust environment to complete the service request, the request manager passes the service request to a service provisioning manager.

10. The product of claim 9, wherein the request manager is to identify multiple devices in the trust environment that collectively provide services capable of completing the service request.

11. The product of claim 9, wherein the programming, when executed, further causes: with the service provisioning manager, signaling a resource manager to instantiate a new service to complete the service request; and with the request manager, using the new service to complete the service request.

* * * * *